May 30, 1944.   E. W. DAVIS   2,350,017
TUBE COUPLING
Filed Oct. 2, 1942

Inventor:
Ernest W. Davis

Patented May 30, 1944

2,350,017

UNITED STATES PATENT OFFICE 2,350,017

TUBE COUPLING

Ernest W. Davis, River Forest, Ill., assignor to The Imperial Brass Manufacturing Company, Chicago, Ill., a corporation of Illinois Application October 2, 1942, Serial No. 460,479

8 Claims. (Cl. 285—122)

My invention relates to tube couplings whereby a tube may be secured to a body member in fluid tight engagement therewith.

The general object of my invention is to provide a tube coupling which is convenient to use and which is durable and efficient in operation.

A more specific object is to provide a tube coupling which will not cause impairment of the tube with which it is connected after long continued vibration thereof.

Another object is to provide a tube coupling which functions properly when used with a tube which is either slightly undersize or slightly oval-shaped in transverse section.

A further object is to provide a tube coupling which may be screwed to its tightened, locking position with less rotative motion than that necessary in prior devices of this class. These and other objects will appear as the description proceeds.

Figure 1:
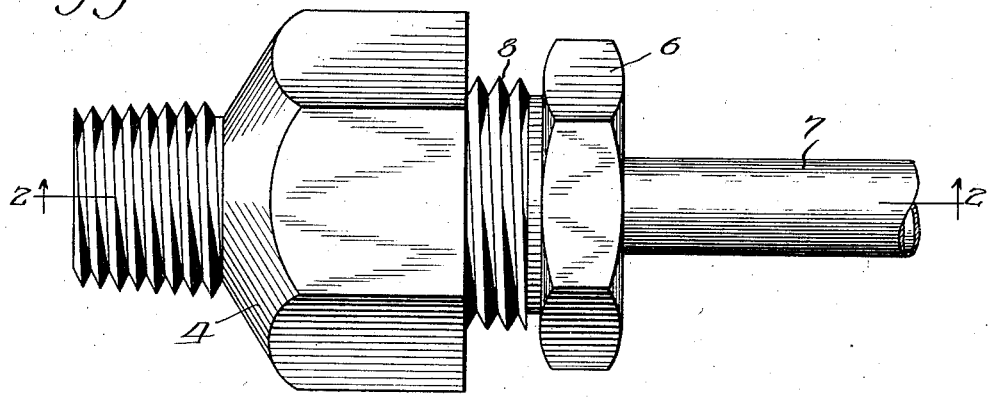
Figure 1 is a side elevation of the complete coupling with a tube inserted and ready to be screwed to its tightened position.
Figure 2:
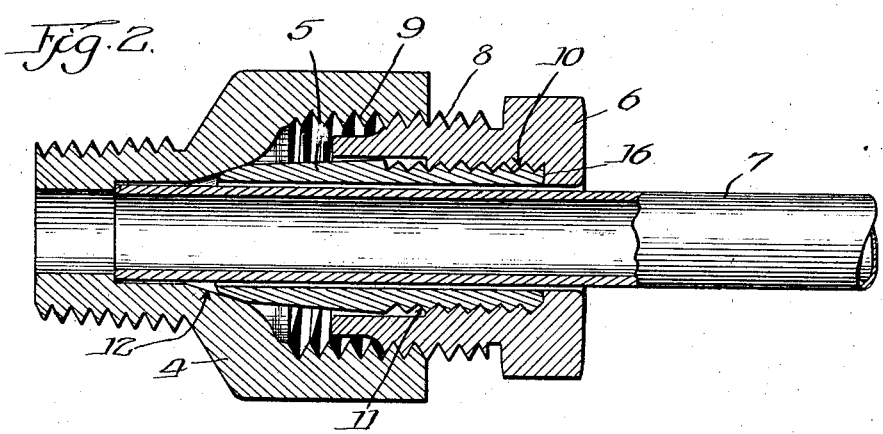
Figure 2 is a longitudinal section through the line 2, 2, in Figure 1.

Referring to Figure 2, the coupling comprises a body member 4, a sleeve 5, and a bushing 6, all of which are bored to provide for free and easy insertion of the tube 7 to the position shown. The bushing 6 is provided with external right hand threads 8 for engaging the right hand threads 9 in the body member 4, and is also provided with internal left hand threads 10 for engaging the left hand threads 11 of the sleeve 5. Both these left hand threads are cut at a special angle of approximately 90 degrees instead of the usual standard angle of 60 degrees. These threads are cut in this manner for a special purpose which will be described hereinafter.

Figure 3:
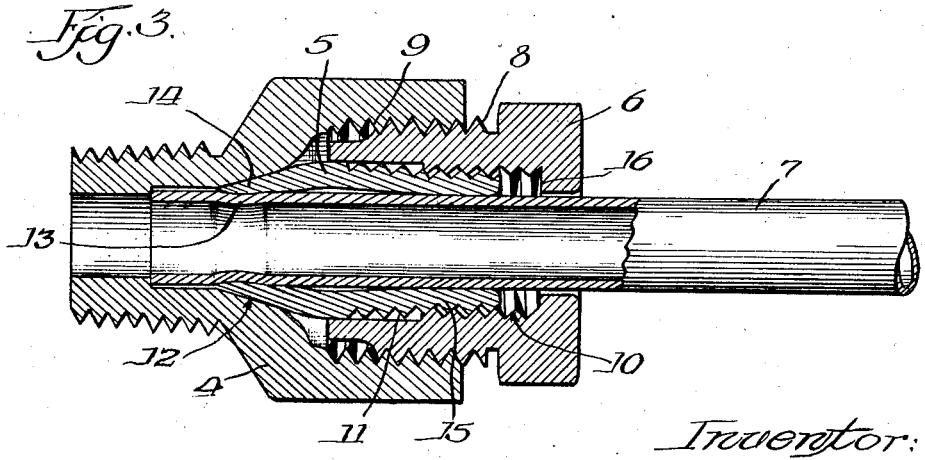
Figure 3 is the same view as Figure 2, except that the coupling has been screwed to its tightened position.

The body member 4 is provided with a tapered portion 12 for making a fluid tight connection with the sealing portion 14 of the sleeve 5 when the bushing 6 is screwed in a right hand direction to the position shown in Figure 3. It will be observed that screwing the bushing 6 in a right hand direction will advance the bushing 6 to the left, relative to the body member 4, and will also advance the sleeve 5 relative to the bushing 6, owing to the left hand threads 10 and 11.

When the sleeve 5 is advanced to the position shown in Figure 3, its sealing portion 14 is compressed as shown, thereby compressing and deforming the portion 13 of the tube 7. This provides a fluid tight joint between the tube and the sleeve and also provides a locking means to prevent longitudinal displacement of the tube 7, as will be readily understood.

The purpose of the special 90 degree threads will now be explained. The bushing 6 is constructed of steel, and the sleeve 5 is constructed of soft brass, so that forceful tightening of the bushing 6 causes the 90 degree threads to slide over each other to a certain extent, thereby crowding the soft brass of the sleeve inwardly until it bears against the tube 7 to provide a clamping action and thereby prevent radial displacement of the tube 7. It will be observed that the angle of the tapered portion 12 is more acute than the angle of the threads 10 and 11, so that the greater friction of the tapered portion prevents rotation of the sleeve 5 during rotation of the bushing 6.

Due to the double action of the right and left hand threads used in this coupling, relatively little rotation of the bushing 6 is necessary to effect a tight seal. This reduces by approximately 50% the time required for tightening the bushing as compared with prior couplings of this class, and as this operation is ordinarily performed by hand tools, a considerable saving in labor is effected.

In couplings of this class, wherein a portion of the tube is deformed, it has been found that the deformed portion crystallizes and breaks when the tube is subjected to prolonged vibration. This can be overcome to a great extent by providing a very snug fit between the tube and the bushing, so as to prevent all radial displacement of the tube and thereby prevent localizing the vibrating motion at the weakened, deformed portion. But this makes the insertion of the tube in the coupling too difficult for practical purposes, and requires the use of tubing having an exact outside diameter and perfectly round in transverse section, conditions which are not found in practice.

The coupling of this invention can be manufactured with a liberal clearance around the tube, so as to allow easy insertion of the tube, even when slightly out of round, and still provide a snug fitting support for the tube after the bushing 6 is tightened. This advantage is obtained by the compression of the sleeve 5 against the tube 7, as hereinbefore described.

The angle of the tapered portion 12 is more acute than the angle of the threads 10 and 11, so that the compressive force of the threads will be less than that of the tapered portion; also, the clamping portion 15 of the sleeve 5 has a greater area than the sealing portion 14, so that the tube 7 is not deformed by the clamping action of the clamping portion 15.

Obviously, if the tube 7 was compressed by the clamping portion 15 with sufficient force to cause deformity of the tube, it would produce another weakened portion, unprotected against the localized action of vibrations in the tube 7. Prior couplings of the same general type compress the tube in two places and deform the tube in two places, while the coupling of this invention compresses the tube in two places, but deforms it in only one place, and provides a support for the tube at the other place of compression.

The coupling is assembled by screwing the sleeve 5 into the bushing 6 until the sleeve strikes the shoulder 16. The bushing 6 with the sleeve 5 contained therein is then screwed into the body member 4 to the position shown in Figure 2. The coupling may be furnished to users in this assembled condition and the user may then install the coupling without disassembling any of its parts. All the user does is to screw the body in place, insert the tube as far as it will go, and tighten the bushing.

I claim:

1. In a tube coupling, a body member having a bore therethrough, said body member having an internally threaded portion and an internal tapered portion; an externally threaded sleeve movable longitudinally forward in said body member to engage said tapered portion and form a fluid-tight seal therewith; and a rotatable bushing having internal threads for engaging said sleeve threads and having external threads for engaging said body threads, one of said bushing threads being right hand and the other left hand, and the angle of said tapered portion being more acute than the angle of said sleeve threads, whereby the friction of rotation between said sleeve and said tapered portion is greater than the friction between said sleeve threads and said bushing threads, and whereby rotation of said bushing in a direction to cause forward movement thereof will also cause forward movement of said sleeve relative to said bushing.

2. A compression coupling for tubing comprising a body having a recess and a tapered deflecting portion at the base thereof, a bushing threadably engaging the body and a sleeve within the bushing having a reversely threaded engagement therewith and a tapered sealing portion adapted to engage the tapered deflecting portion, said sleeve being thereby advanced automatically relative to the bushing and into the body at a more rapid rate than the bushing as the coupling is assembled.

3. A compression coupling for tubing comprising a body having a recess and a tapered deflecting portion at the base thereof, a bushing threadably engaging the body having a passage therethrough for the tubing and having threads therein reversed relative to the body engaging threads, and a sleeve having an aperture therein providing clearance around the tubing threadedly engaging the reversed threads of the bushing, said sleeve having a tapered sealing portion adapted to engage the tapered deflecting portion when advanced relative to the bushing upon engagement of the bushing with the body.

4. A compression coupling for tubing comprising a body having a recess and a tapered deflecting portion at the base thereof, a bushing threadably engaging the body having a passage therethrough providing ample clearance for the tubing and having threads therein reversed relative to the body engaging threads, and a sleeve having an aperture therein providing an ample clearance around the tubing threadedly engaging the reversed threads of the bushing, said sleeve having a tapered sealing portion adapted to engage the tapered deflecting portion when advanced relative to the bushing upon engagement of the bushing with the body, the threaded portion of said sleeve being deflected into surface contact with the tubing in coupled position.

5. A compression coupling for tubing comprising a body having a recess and a tapered deflecting portion at the base thereof, a bushing threadably engaging the body having a passage therethrough providing ample clearance for the tubing, an annular set back portion in said passage providing a shoulder and having threads therein reversed relative to the body engaging threads, said threads having a thread angle greater than standard, and a sleeve having an aperture therein providing an ample clearance around the tubing abutting the shoulder in initial position and threadedly engaging the reversed threads of the bushing, said sleeve having a tapered sealing portion adapted to engage the tapered deflecting portion when advanced relative to the bushing upon engagement of the bushing with the body, the threaded portion of said sleeve being deflected into surface contact with the tubing in coupled position.

6. A compression coupling for tubing comprising a body having an internally threaded recess and a tapered deflecting portion adjacent the base of the threads, a bushing having an externally threaded recess adapted to engage the body recess, said bushing having a passage therethrough, said passage having a wider portion bearing internal threads reversed relative to the external threads, a sleeve having a central aperture surrounding the tube, a tapered sealing portion on the sleeve engageable with the deflecting portion of the body having a position pressed into the wall of the tubing when the coupling is made up and a portion remote from the tapered sealing portion threaded to correspond with the internal bushing threads, said sleeve being adapted to be advanced relative to the bushing when the coupling is made up.

7. A compression coupling for tubing comprising a body having an internally threaded recess and a tapered deflecting portion adjacent the base of the threads, a bushing having an externally threaded recess adapted to engage the body recess, said bushing having a passage therethrough, said passage having a wider portion bearing internal threads reversed relative to the external threads and a shoulder at the base of the wider portion, a sleeve having a central aperture surrounding the tube, a tapered sealing portion on the sleeve engageable with the deflecting portion of the body having a position pressed into the wall of the tubing when the coupling is made up and a portion remote from the tapered sealing portion threaded to correspond with the internal bushing threads and initially in contact with the shoulder, said sleeve being adapted to be advanced relative to the bushing when the coupling is made up and having the portion of the threaded end thereof within the passage deflected into surface contact with the tubing.

8. A compression coupling for tubing comprising a body having an internally threaded recess and a tapered deflecting portion adjacent the base of the threads, a bushing having an externally threaded recess adapted to engage the body recess, said bushing having a passage therethrough providing substantial clearance for the tubing, said passage having a wider portion bearing internal threads of greater thread angle than standard threads and reversed relative to the external threads and a shoulder at the base of the wider portion, a sleeve having a central aperture for loosely surrounding the tube, a tapered sealing portion on the sleeve engageable with the deflecting portion of the body having a position pressed into the wall of the tubing when the coupling is made up and a portion remote from the tapered sealing portion threaded to correspond with the internal bushing threads and initially in contact with the shoulder, said sleeve being adapted to be advanced relative to the bushing when the coupling is made up and having the portion of the threaded end thereof within the passage deflected into surface contact with the tubing.

ERNEST W. DAVIS